United States Patent
Wang et al.

(10) Patent No.: US 8,478,308 B2
(45) Date of Patent: Jul. 2, 2013

(54) POSITIONING SYSTEM FOR ADDING LOCATION INFORMATION TO THE METADATA OF AN IMAGE AND POSITIONING METHOD THEREOF

(75) Inventors: Chung-Jen Wang, Tu-Cheng (TW); Li-Sheng Shu, Shenzhen (CN); Tsung-Jen Chuang, Tu-Cheng (TW); Shih-Fang Wong, Tu-Cheng (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 176 days.

(21) Appl. No.: 13/071,480

(22) Filed: Mar. 24, 2011

(65) Prior Publication Data

US 2012/0184289 A1    Jul. 19, 2012

(30) Foreign Application Priority Data

Jan. 18, 2011    (CN) .......................... 2011 1 0020380

(51) Int. Cl.
    *H04W 24/00*    (2009.01)
(52) U.S. Cl.
    USPC ............... 455/457; 455/456.1; 455/456.6; 455/550.1; 455/556.1; 455/517; 348/14.02
(58) Field of Classification Search
    USPC ............. 455/41.1–41.3, 456.1–457, 550.1, 455/556.1–557, 418–420, 517–519
    See application file for complete search history.

(56) References Cited

U.S. PATENT DOCUMENTS

| | | | |
|---|---|---|---|
| 6,522,889 B1 * | 2/2003 | Aarnio | 455/456.5 |
| 6,741,864 B2 * | 5/2004 | Wilcock et al. | 455/456.1 |
| 7,065,370 B2 * | 6/2006 | Ogaki et al. | 455/457 |
| 7,274,931 B2 * | 9/2007 | Harris | 455/419 |
| 7,630,737 B2 * | 12/2009 | Pande et al. | 455/556.1 |
| 7,797,019 B2 * | 9/2010 | Friedmann | 455/556.1 |
| 7,983,692 B2 * | 7/2011 | Koike | 455/456.1 |
| 8,204,684 B2 * | 6/2012 | Forstall et al. | 701/433 |
| 8,218,015 B2 * | 7/2012 | Wun | 348/207.99 |
| 8,320,941 B2 * | 11/2012 | Ichinose | 455/457 |
| 2003/0083048 A1 * | 5/2003 | Robinson et al. | 455/412 |
| 2004/0157622 A1 * | 8/2004 | Needham | 455/456.1 |
| 2004/0224700 A1 * | 11/2004 | Sawano | 455/456.1 |
| 2007/0200862 A1 * | 8/2007 | Uchiyama et al. | 345/564 |
| 2008/0317456 A1 * | 12/2008 | Lee et al. | 396/321 |
| 2009/0280824 A1 * | 11/2009 | Rautiainen | 455/456.1 |
| 2009/0284553 A1 * | 11/2009 | Seydoux | 345/649 |
| 2010/0145607 A1 * | 6/2010 | Chen et al. | 701/201 |

* cited by examiner

*Primary Examiner* — Sharad Rampuria
(74) *Attorney, Agent, or Firm* — Altis Law Group, Inc.

(57) ABSTRACT

A positioning system includes a first mobile device and a second mobile device. The first mobile device includes a first wireless communication unit and an imaging unit. The second mobile device includes a second wireless communication unit and a location information obtaining unit. When an image is captured by the first mobile device, the first mobile device can communicate with the second mobile device to obtain position information, which is then included in EXIF of the just captured image.

7 Claims, 2 Drawing Sheets

POSITIONING SYSTEM FOR ADDING LOCATION INFORMATION TO THE METADATA OF AN IMAGE AND POSITIONING METHOD THEREOF

BACKGROUND

1. Technical Field

The present disclosure relates to the positioning systems and positioning methods and, particularly, to a positioning system that can add location information to the metadata of an image, and a positioning method employed by the system.

2. Description of Related Art

Nowadays, there are phones and cameras with built-in systems capable of obtaining location information of the phone or camera when it captures an image, and combining the location information with the image. It is desirable to provide a system and method to enable phones and cameras without built-in locating systems to obtain location information.

BRIEF DESCRIPTION OF THE DRAWINGS

The components of the drawings are not necessarily drawn to scale, the emphasis instead being placed upon clearly illustrating the principles of a positioning system and positioning method. Moreover, in the drawings, like reference numerals designate corresponding parts throughout several views.

DETAILED DESCRIPTION

Figure 1:
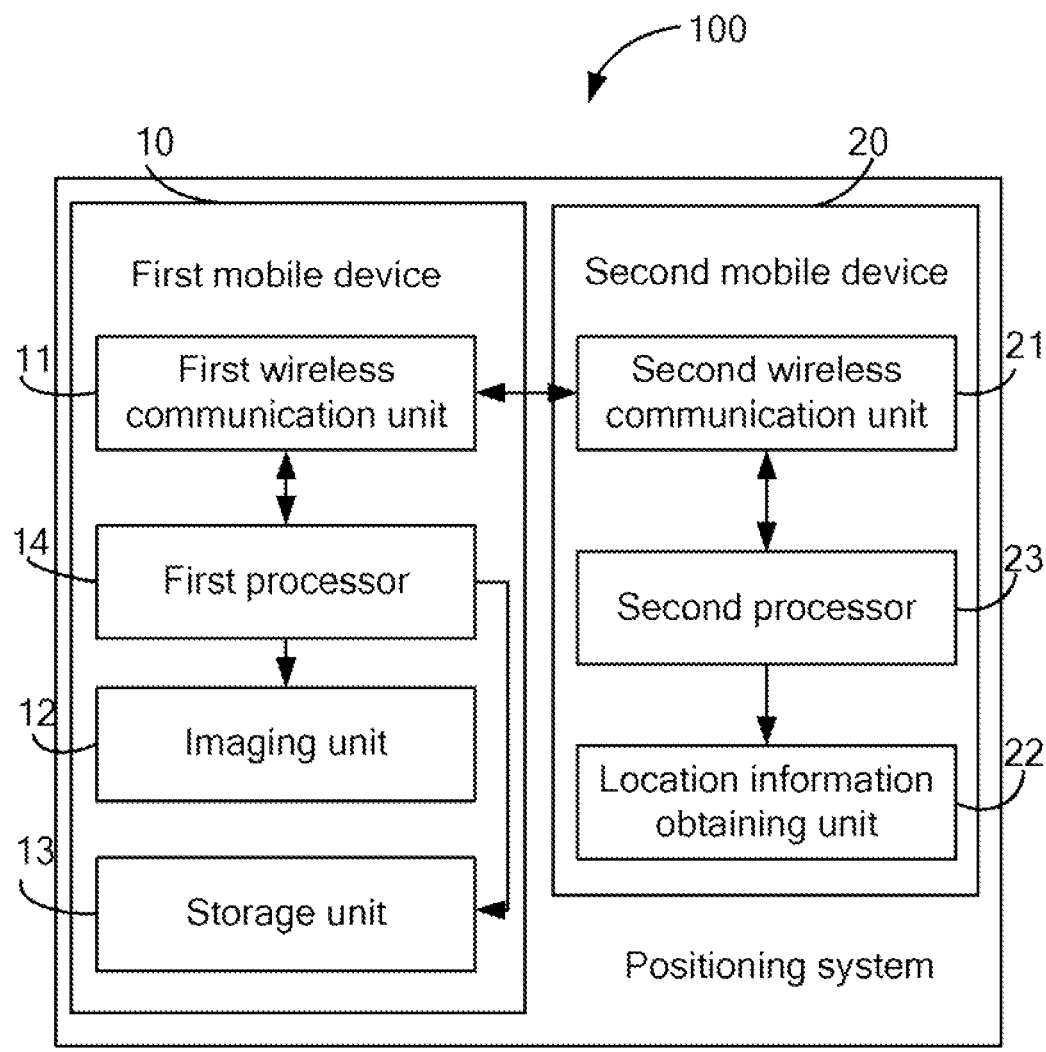
FIG. 1 is a block diagram of a positioning system in accordance with an exemplary embodiment.

Referring to FIG. 1, a block diagram of a positioning system 100 in accordance with an exemplary embodiment is shown. The system 100 includes a first mobile device 10 and a second mobile device 20. The first mobile device 10 is capable of capturing images, but cannot locate its position on its own. The second mobile device 20 has a location positioning function, but may not have an image capturing function.

The first mobile device 10 includes a first wireless communication unit 11, an imaging unit 12, a storage unit 13, and a first processor 14. The second mobile device 20 includes a second wireless communication unit 21, a location information obtaining unit 22, and a second processor 23.

The first mobile device 10 can communicate with the second mobile device 20 through the first wireless communication unit 11 and the second wireless communication unit 21. The first wireless communication unit 11 and the second wireless communication unit 21 may both be a WI-FI module or a Bluetooth module. In the embodiment, when the distance between the first wireless communication unit 11 and the second wireless communication unit 21 is less than a preset value, the signal from the first wireless communication unit 11 or the second wireless communication unit 21 can be received by the second wireless communication unit 21 or the first wireless communication unit 11. Otherwise, the signal from the first wireless communication unit 11 or the second wireless communication unit 21 can not be received by the second wireless communication unit 21 or the first wireless communication unit 11.

The imaging unit 12 is used to capture images in JPEG or TIFF format and includes EXIF data to the images.

The location information obtaining unit 22 is utilized to obtain the current location information of the mobile device 10. In the embodiment, the location information includes latitude and longitude.

The first processor 14 is used to control the imaging unit 12 to capture an image in response to a user operation, and transmits a location request signal through the first wireless communication unit 11 to the second wireless unit 21.

The second processor 23 is used to receive the location request signal through the second wireless communication unit 21, control the location information obtaining unit 22 to obtain the location information of the second wireless communication unit 21, and transmit the location information through the second communication unit 21 to the first wireless unit 11. When the first mobile device 10 and the second mobile device 20 are both carried by the same person, the location information obtained by the location information obtaining unit 22 also indicates the position of the first mobile device 10.

The first processor 14 is used to receive the location information through the first wireless communication unit 11, and include the location information in the EXIF data associated with the previously (just taken) captured image. The first processor 14 then stores the image in the storage unit 13. Therefore, when needed, the location information regarding where the image was captured can be displayed together with the image.

Figure 2:
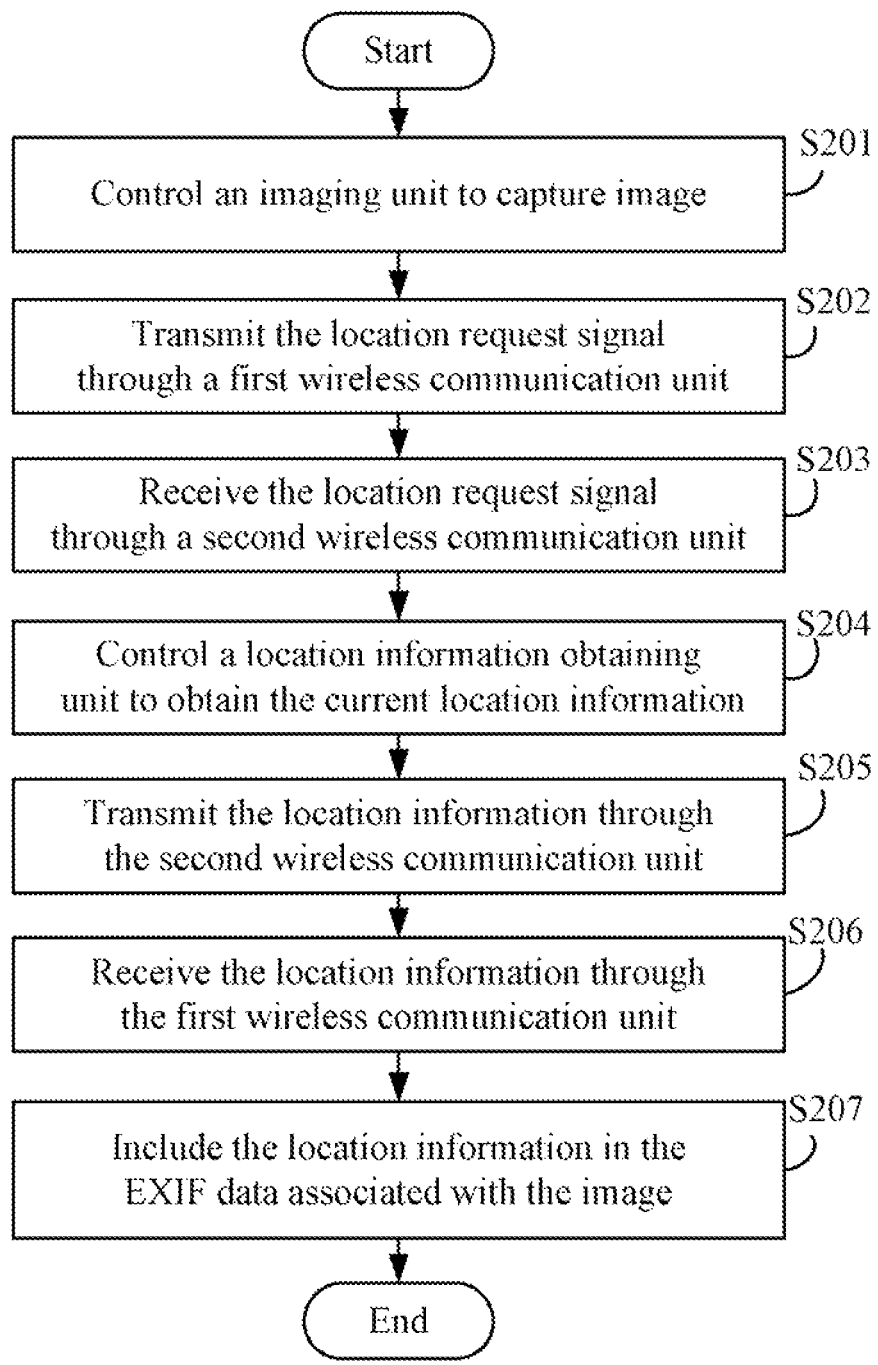
FIG. 2 is a flowchart of a positioning method in accordance with an exemplary embodiment.

Referring to FIG. 2, a flowchart of a positioning method in accordance with an exemplary embodiment is shown.

In step S201, the first processor 14 controls the imaging unit 12 to capture an image in response to a user operation.

In step S202, the first processor 14 transmits a location request signal through the first wireless communication unit 11 to the second wireless communication unit 21.

In step S203, the second processor 23 receives the location request signal through the second wireless communication unit 21.

In step S204, the second processor 23 controls the location information obtaining unit 22 to obtain the current location information.

In step S205, the second processor 23 transmits the location information through the second wireless communication unit 21 to the first wireless communication unit 11.

In step S206, the first processor 14 receives the location information through the first wireless communication unit 11.

In step S207, the first processor 14 includes the location information in the EXIF data associated with the just captured image.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A positioning system comprising:
a first mobile device comprising:
a first wireless communication unit;
an imaging unit; and
a first processor to control the imaging unit to capture an image in response to a user operation, and to transmit a location request signal through the first wireless communication unit upon the imaging unit capturing the image; and
a second mobile device comprising:
a second wireless communication unit to communicate with the first wireless communication unit;

a location information obtaining unit to obtain current location information of the first mobile device; and a second processor to receive the location request signal through the second wireless communication unit, to control the location information obtaining unit to obtain the location information of the first mobile device upon receiving the location request signal, and to transmit the location information through the second wireless communication unit after the location information obtaining unit obtains the location information of the first mobile device;

wherein the first processor receives the location information through the first wireless communication unit, and includes the location information in the image taken by the imaging unit upon receiving the location information;

wherein each of the images taken by the imaging unit comprises EXIF data, the location information is included in the EXIF data associated with the image.

2. The positioning system as described in claim 1, wherein the first mobile device further comprises a storage unit, the first processor further stores the image included the location information in the storage unit.

3. The positioning system as described in claim 1, wherein the first wireless communication unit and the second wireless communication unit are WI-FI modules or Bluetooth modules.

4. The positioning system as described in claim 1, wherein the location information comprises latitude and longitude.

5. A positioning method implemented by a positioning system, the positioning system comprising a first mobile device and a second mobile device, the first mobile device comprising a first wireless communication unit and an imaging unit, the second mobile device comprising a second wireless communication unit and a location information obtaining unit, the first wireless communication unit communicating with the second wireless communication unit, the imaging unit being to capture images, the location information obtaining unit being to obtain the current location information, the positioning method comprising:

controlling the imaging unit to capture an image in response to a user operation;

transmitting the location request signal through the first wireless communication unit upon the imaging unit capturing the image;

receiving the location request signal through the second wireless communication unit; controlling the location information obtaining unit to obtain the current location information of the first mobile device upon receiving the location request signal;

transmitting the current location information through the second wireless communication unit upon obtaining the location information of the first mobile device;

receiving the current location information through the first wireless communication unit; and including the location information in the image taken by the imaging unit upon receiving the current location information; and including the location information in the EXIF data associated with the image taken by the imaging unit upon receiving the current location information;

wherein the image comprises EXIF data.

6. The positioning method as described in claim 5, the first mobile device further comprising a storage unit, wherein the positioning method further comprises:

storing the image included the location information to the storage unit.

7. The positioning method as described in claim 5, wherein the location information comprises latitude and longitude.

* * * * *